Patented Dec. 26, 1933

1,940,709

UNITED STATES PATENT OFFICE 1,940,709

MANUFACTURE OF CELLULOSE DERIVATIVES

Henry Dreyfus, London, England

No Drawing. Application March 21, 1929, Serial No. 348,976, and in Great Britain March 28, 1928

30 Claims. (Cl. 260—101)

This invention relates to the manufacture of new cellulose derivatives; to a new pretreatment of cellulosic materials particularly suitable for enabling them to be easily converted into the new cellulose derivatives; to the production from the new cellulose derivatives of artificial silk, horsehair or other artificial fibres, films, plastic masses, moulded articles, moulding powders, varnishes, solutions and to other applications thereof; and to the colouring or other treatment of the cellulose derivatives or materials or articles made therefrom.

The new cellulose derivatives are manufactured according to the present invention by the substitution of one or more hydroxy groups of the cellulose molecule by one or more alkoxy-aliphatic acidyl groups, that is to say the acid groups of alkyl ethers of hydroxy aliphatic acids or substitution products thereof. For convenience the new cellulose derivatives will be termed hereinafter alkoxyalkacyl derivatives of cellulose. In the case of alkoxyacetyl derivatives they will have the general formula $$C_6H_{(10-n)}O_{(5-n)}[O.CO.CH_2OR]_n$$

where $n$ is the degree of acylation and R an alkyl group.

The acylation may be carried to the mono-, di- or tri-acyl stage or to a higher stage of acylation or to any intermediate stage but the most valuable commercial results are obtained when the reaction is carried to the tri-acyl stage or to between the di- and tri-acyl stage. The substitution of the hydroxy group is best effected with the anhydrides of the ethers of hydroxy aliphatic acids.

The anhydrides, hereinafter in the claims referred to as alkoxyalkacidic anhydrides, may be derived from any convenient alkyl ethers of hydroxy aliphatic acids. I prefer however to employ the anhydrides corresponding to the low alkyl ethers, such as methyl or ethyl ethers, of the lower monohydroxy aliphatic acids, such as glycollic and lactic acid. The anhydrides may be prepared by any convenient method. For example they may be prepared from the sodium, potassium or other metallic salts of the acids by treatment with sulphur and chlorine or sulphur chlorine compounds as described in British Patent No. 313,233, with oxides of sulfur and chlorine or the compounds of oxides of sulfur with chlorine as described in British Patent No. 313,235 or with phosgene as described in British Patent No. 313,234 or by the thermal decomposition of the acids themselves as described in British Patent No. 317,342.

As initial materials for acylation according to the present invention cotton or any other celluloses or near conversion products thereof may be employed, or bamboo, esparto or wood pulps from which the lignin, pentosan, resin and like constituents have been substantially removed, as for example in sulphite pulp, soda pulp and sulphate pulp.

In order to increase their reactivity the cellulosic materials may be treated, prior to the acylation, with organic acids in small or large quantities and particularly with the lower alkoxy-aliphatic acids, such as the methyl or ethyl ether of glycolic acid. Such a pretreatment with alkoxy-aliphatic acids is new and constitutes an important feature of the present invention. Lower fatty acids, such as formic acid or acetic acid, may be employed but are preferably substantially removed prior to the acylation. Chemical wood pulps, such as referred to above, are preferably subjected to an alkaline purifying treatment as described in U. S. Patent No. 1,711,110, followed by the treatment with organic acids, prior to the acylation. The alkaline purifying treatment, may, for example, be performed with caustic alkali of low concentration, such as 3% or under, with heating or boiling, or with caustic alkali of high concentration, such as 5–10% or more, in the cold or with only slight heating.

The pretreatment with organic acids may be carried out in any convenient manner. For example, the cellulosic materials may be pretreated with concentrated or dilute acids as described in French specification No. 565,654, or, where feasible, with the vapours of the acids, as described in British Patent No. 263,938, the vapours being employed alone or mixed with air or other inert gas. After the treatment with organic acids, the cellulosic materials may be subjected to a stream of air or other inert gas or to suction or vacuum to remove the organic acids wholly or partially. If for the pretreatment an acid is used which will serve as a solvent diluent in the subsequent acylation or which corresponds to the anhydride to be employed in the subsequent acylation, for instance methoxy-acetic acid, its removal is of course unnecessary. For this reason I prefer to employ for the purpose of the present invention a pretreatment with alkoxy-aliphatic acids.

Another type of pretreatment, which I have found very efficacious for rendering the cellulosic material more reactive, is that described in British Patent No. 312,098. The cellulosic material is treated with hydrochloric or other hydrohalide acid or with mixtures thereof. The acid is most advantageously employed in a proportion of 5–10% (corresponding to about 15–30% of commercial acid in the case of hydrochloric acid). The aqueous acids may be distributed evenly over the cellulosic material, for instance by spraying the material in a drum or mixer, the cellulosic material being allowed to stand with occasional turning to ensure uniform impregnation until a product capable of rapid acylation. This type of pretreatment is most valuable when hydrochloric or other hydrohalide acid is to be employed in the subsequent acylation as hereinafter described. The metallic halide catalysts referred to below for use in conjunction with hydrochloric or other hydrohalide acid may moreover be used alone or together with the acid as pretreating agents.

The pretreatment with hydrohalide acids may furthermore be combined with a pretreatment with organic acids as described above, the two treatments being conducted simultaneously or successively. Furthermore the pretreatment with organic acids may be combined with a pretreatment with other mineral acids, for example sulphuric acid.

The actual acylation of the cellulose or cellulose-containing material with the anhydrides may be carried out in presence of a solvent for the cellulose derivative produced so that the cellulose derivative goes into solution. The use of the alkoxy fatty acid, for example methoxy-acetic acid, corresponding to the anhydride employed in the acylation is advantageous from the point of view of recovery of reagents. The invention is however not limited to the use of any particular solvent. Mixtures of two or more liquids which together constitute a solvent or mixtures of two or more solvents may also be employed. Solvents which provide acyl groups tending, under the conditions of the acylation, to enter the cellulose molecule in preference to the required alkoxy-alkacyl groups should be avoided. The methoxy-acetic acid or equivalent solvent or solvent mixture may be present in any desired quantity such as 4 to 6 times the weight of the cellulose or cellulose-containing material, but cellulose derivatives of especially high viscosity can be obtained if the solvent or solvent mixture be present in an amount greater than 6 times, say 8 to 20 times or more the weight of the cellulose or cellulose-containing material.

Alternatively the acylation may be conducted in suspension in non-solvent liquid diluents. If desired solvents may be present in addition to the non-solvent liquid diluents. Again as in the acylation in presence of a solvent referred to in the preceding paragraph, the solvent may be used in quantities in excess of 6 times the weight of the cellulose, for example, 8 to 20 times or more to obtain cellulose derivatives of high viscosity. In all such cases of using solvents in addition to liquid diluents, the liquid diluent should be present in sufficient quantity to prevent solution of the cellulose derivative produced.

As a further modification the acylation may be performed substantially in absence of liquid solvents or diluents by employing vapours of the anhydride where this is feasible. However, in order to avoid degradation of the cellulose, this method entails the use of reduced pressures and, since it does not yield the results of the solution or suspension methods, it is not to be recommended.

Fibres, fabrics or the like made of or containing cotton or other cellulosic material may be acylated, for example methoxyacetylated, by means of the processes of the present invention by carrying out the acylation so that the cellulose derivative produced does not go into solution.

The treatment with the anhydrides of the ethers of hydroxy aliphatic acids should be conducted in presence of a suitable catalyst. Sulphuric acid or organically substituted sulphuric acids such as benzene sulphonic acid, bisulphates, e.g. sodium bisulphates, phosphoric acid, sulphuryl chloride, zinc chloride and the like may be employed. Metallic halides, for example the chlorides of iron (especially ferric), tin (stannic), manganese, copper, nickel or cobalt, used in conjunction with hydrochloric or other hydrohalide acids give very useful results. Stannic and ferric chlorides are even capable of giving satisfactory acylation without hydrochloric acid. A pretreatment of the cellulosic material with organic and/or hydrohalide acids is in all cases to be recommended, but in the case of using as catalysts ferric or stannic halides without hydrohalide acids it is particularly desirable since the temperatures which would otherwise be necessary to effect complete acylation are unduly high. The quantity of catalyst to be employed will vary with the catalyst selected, with the type of cellulosic material to be treated and with the temperature and other conditions of acylation. Sulphuric acid should preferably be employed in proportions under 15% calculated on the weight of the cellulose and especially in proportions of 1 to 10%, while the ferric chloride, stannic chloride, or other halides given above should preferably be employed in a proportion of 5 to 20% on the weight of the cellulose, or if used in conjunction with hydrochloric or other hydrohalide acid both the halide itself and the hydrohalide acid should preferably be present in proportions of between 5 and 15% on the weight of the cellulose.

In order to avoid degradation of the cellulose molecule the acylation according to the present invention is preferably conducted at temperatures not substantially exceeding 50° C. With sulphuric acid or like strong catalysts the most valuable derivatives are obtained if the acylation is performed at low temperatures, for example below atmospheric, e. g. 10° C. to 5° or 0° C. or lower, at ordinary temperatures, or at temperatures, such as 20° to 30° C. not substantially above atmospheric. Greater care will in general be necessary in the control of the temperature in the case of using sulphuric acid as catalyst as compared with using the halide catalysts referred to above. For example when using ferric chloride heating may be employed without impairing the quality of the products. The control of the temperature of the reaction is considerably facilitated if the acylating mixture is cooled before the introduction of the cellulosic material. This precooling may be carried to between 0 and 5° C. but may be carried to below 0° C.

The following examples are illustrative of suitable methods of acylation but the invention is by no means limited to these methods:—

*Example 1*

100 parts by weight of cotton or other cellulose are introduced into a mixture, precooled to about 0 to 5° C., consisting of 700 parts of methoxyacetic acid, 480 parts of methoxyacetic anhydride and 10 to 12 parts of sulphuric acid. The temperature may be allowed to rise slightly during the initial stages of the reaction but cooling should be continued until solution is almost complete, when the temperature may without disadvantage rise to 30 to 35° C. Complete solution occurs usually in under 10 hours. The product, which is cellulose methoxyacetate, may be isolated from solution by means of water or other non-solvent medium, for example petroleum ether. It is of course soluble in methoxyacetic acid and is also soluble in acetic acid and in chloroform-alcohol. Instead of isolating the primary product from its acylation solution it may be subjected to secondary treatments as hereinafter described.

*Example 2*

100 parts by weight of cotton cellulose are treated as in Example 1 but with an acylating mixture consisting of 700 parts of ethoxyacetic acid, 560 parts of ethoxyacetic anhydride and 10 to 12 parts of sulphuric acid. The acylation and separation may be conducted as described in Example 1 above. The cellulose ethoxyacetate has similar properties to the cellulose methoxyacetate.

*Example 3*

100 parts by weight of cellulose are steeped for about 12 hours in the cold in 500 parts of methoxyacetic acid. 15 parts of ferric chloride, 15 parts of 35% aqueous hydrochloric acid and 500 parts of methoxyacetic anhydride are added and the reaction allowed to proceed at about 20° C. When solution is nearly complete, say after about 6 to 8 hours, the temperature may be allowed to rise to about 40° C. The cellulose methoxyacetate produced may be isolated or further treated as in Example 1.

*Example 4*

100 parts by weight of cellulose are pretreated for 6 to 10 hours at about 30° C. with a mixture of 400 parts of methoxyacetic acid and 5 parts of sulphuric acid. The whole is then cooled to about 0 to 10° C. and introduced into a mixture of 1500 parts of benzene, 500 parts of methoxyacetic anhydride and a further 5 parts of sulphuric acid. The temperature is allowed to rise slowly to a maximum of about 20–25° C. at about 6 to 8 hours from the beginning of the acylation. The cellulose methoxyacetate is separated from the acylating mixture and may be washed with water.

*Example 5*

100 parts by weight of cotton cellulose are pretreated with formic acid, for example by treatment with 500–1000 parts of formic acid of about 85% strength, allowing to stand for some hours in the cold and hydro-extracting or by impregnating with about 15 parts of formic acid of 75–85% strength and allowing to stand for 8–12 hours. The material is then washed, centrifuged and dried. The pretreated cellulose is introduced into a mixture of 500 to 700 parts of methoxyacetic acid, 400 parts of methoxyacetic anhydride and 25 parts of sulphuryl chloride. Cooling is unnecessary at first and as the reaction proceeds the temperature may be allowed to rise or may be raised to about 50° C. when solution is almost complete. The cellulose methoxyacetate may be separated from the reaction mixture or may be further treated as in Example 1.

*Example 6*

100 parts of cotton cellulose are sprayed with a mixture of 15 parts of 35% aqueous hydrochloric acid, 15 parts of stannic chloride and 100 parts of methoxyacetic acid and the mass is allowed to stand with occasional stirring for 3–6 hours. The pretreated mass is then introduced into a mixture of 600 parts of methoxyacetic acid and 500 parts of methoxyacetic anhydride. The reaction is conducted at atmospheric temperature throughout. The cellulose methoxyacetate may be isolated or further treated as referred to in Example 1.

Though the invention has been described above more particularly with reference to the substitution of the hydroxy groups of cellulose by means of the acid groups of the lower alkyl ethers of the lower hydroxy fatty acids, it is to be understood that it includes the production of the cellulose derivatives of other ethers of hydroxy fatty acids, for example of the propyl and other ethers of glycolic and lactic acids, of the methyl, ethyl, propyl and other ethers of hydracrylic acid and of homologues of these acids, of the dimethyl, ethyl, propyl and other ethers of glyceric acid and also of substitution products of ethers of hydroxy acids, such for example as the mono-methyl, ethyl and propyl ethers of glyceric acid.

I have further found that the solubilities of the new alkoxyalkacyl derivatives may be changed or varied, that is to say the primary acylation products may be transformed into products which are soluble in solvents in which the primary products are insoluble, by subjecting them to suitable secondary treatments after the acylation is complete and my invention includes subjecting the new cellulose derivatives to such secondary treatments. Treatment of the new cellulose derivatives with hydrolytic or hydrating agents such as inorganic or organic acids or acid salts or salts having an acid reaction (e. g. ferric chloride) or with aromatic amines, for instance aniline, or salts thereof at ordinary or raised temperatures is very effective in thus transforming them into products exhibiting solubilities different from those of the primary acylation products. These secondary treatments may be carried out in the primary acylation solutions or suspensions after destroying or eliminating any remaining acylating agent, or the derivatives precipitated or separated from the primary acylation solutions or suspensions may be dissolved or suspended and then subjected to the secondary treatments. The treatment should be stopped when the required solubility has been reached. In conducting the secondary treatments in the primary acylation solutions, in most cases the acylation catalysts themselves will be sufficient to effect the change in solubility and it is only necessary to eliminate or destroy any remaining acylating agent and to allow the derivatives to remain in solution with the catalysts at ordinary or raised temperature until the required solubility has been reached. When the acylation has been performed in presence of metallic halides, for example ferric chloride or stannic chloride, with or without hydrochloric or other hydrohalide acids, it is found particularly advantageous to conduct the secondary treatments in the primary acylation solutions or suspensions without neutralizing or eliminating these catalysts or catalyst mixtures. Particularly is this the case when hydrochloric or other hydrohalide acid has been used. However, if such an acid has not been employed in the acylation the secondary treatment may be accelerated by adding it after the acylation is complete.

Example 7

To the primary acylation solution obtained as in Example 1 above and containing sulphuric acid 30–100 parts of water are added and the whole allowed to stand at atmospheric temperature until the required solubility is reached. Thus, for example, according to the duration of the secondary treatments products soluble in alcohol-benzene, in pure acetone and in acetone diluted with water may be obtained.

Similarly the primary acylation solutions obtained according to Examples 2, 3 and 6 above and containing the acylation catalysts may be treated after simple addition of water to achieve the desired solubility properties.

While the secondary treatments of the primary acylation products are with advantage conducted at ordinary or moderate temperatures, the reaction may, if desired, be quickened by heating up to relatively high or high temperatures, even up to 80 or 100° C. but in such cases the presence of free mineral acids is preferably avoided.

The new cellulose derivatives either in their primary acylation solutions and with or without secondary treatments or as primary or secondary derivatives in solution in suitable solvents may be employed for the production of artificial silks, horsehair or other fibres, films (photographic, cinematographic or otherwise) and pellicles and they may further be used for the production of celluloid substitutes or other thermoplastic masses or articles, moulding powders, varnishes, lacquers, solutions, etc.

The new cellulose derivatives may be extruded into filaments, threads or films by either wet or dry spinning processes, and for this purpose they may be employed in the form of solutions of relatively low concentration, for instance 5 to 8% or of medium concentration for example 10 to 20% or of high concentration containing over 20%, e. g. 25 to 30% or more.

In wet spinning solutions of the new cellulose derivatives the precipitating baths may, if desired, consist wholly of a non-solvent liquid or liquids, but it is found that improved results are obtained if to the non-solvent liquid or liquids, e. g. water, a proportion of one or more solvent liquids be added. Any suitable wet spinning apparatus may be used; for example, apparatus of the type employed in the spinning of viscose, cuprammonium and nitro cellulose artificial silks.

For dry spinning artificial silks or fibres of whatever type or cross-section, e. g. flattened, rounded, hollow, cellular or voluminous, from the solutions of the new cellulose derivatives, the apparatus described in U. S. Patent No. 1,602,125, U. S. Patent No. 1,731,317, U. S. Patent No. 1,541,104, British Patent No. 300,998 or British Patent No. 304,674 or any other suitable apparatus may be employed. For the production of cellular, tubular or other voluminous filaments the process described in British Patents Nos. 317,097 and 317,098 may be employed.

For the production of artificial silks or fibres, films etc. as well as for the production of thermoplastic masses, articles and the like, plasticizing or softening agents or high boiling solvents, for example aryl sulphonamides or their alkyl derivatives, may be incorporated in the derivatives or in their solutions.

The present invention includes all such uses of the new cellulose derivatives. Furthermore for such uses the new cellulose derivatives may be mixed with known cellulose esters, e. g. with cellulose acetate, or with cellulose ethers.

The present invention further includes the mordanting, loading and colouration (e. g. dyeing, printing and stencilling) of the new products or of materials containing them. For example it is found that the new cellulose derivatives or products containing them may be mordanted or loaded or dyed, if the mordanting, loading or dyeing solutions or preparations be applied under such conditions that swelling of the cellulose derivatives takes place. For example the materials may be treated with swelling agents, e. g. thiocyanates, acetone etc., previous to or simultaneous with the application of the mordanting, loading or dyeing solutions or the mordanting or loading solutions may be applied under such conditions as to act as swelling agents. The materials thus mordanted acquire an affinity for mordant dyestuffs and also if loaded for many substantive or acid dyestuffs.

The new cellulose derivatives without treatment of any sort exhibit an affinity for basic dyestuffs which may be applied thereto in the form of salts, such for example as the hydrochloride or acetate.

An affinity for substantive dyestuffs and for vat and sulphur colours may be imparted to materials containing the new cellulose derivatives by superficially or partially saponifying them.

Furthermore the new alkoxyalkacyl derivatives of cellulose may be coloured with water-insoluble or relatively water-insoluble colouring matters or compounds applied in the form of aqueous suspensions or dispersions. Such dispersions may be obtained by grinding, by dissolving the colouring matters or compounds in solvents and mixing with water or by treatment with dispersing agents. For examples of colouring matters and compounds and of suitable dispersing agents reference is made to U. S. Patent No. 1,723,271.

What I claim and desire to secure by Letters Patent is:—

1. Alkoxyalkacyl esters of cellulose.
2. Alkoxyacetyl esters of cellulose.
3. Cellulose derivatives of the formula $$C_6H_{(10-n)}O_{(5-n)} [O.CO.CH_2OR]_n$$

where $n$ is the degree of acylation and R is an alkyl group containing up to 2 carbon atoms.

4. Cellulose ethoxyacetates.
5. Cellulose methoxyacetates.
6. Process for the manufacture of new cellulose esters, comprising alkoxyalkacylating materials consisting essentially of cellulose with alkoxyalkacylating agents.
7. Process for the manufacture of alkoxyalkacyl esters of cellulose, comprising alkoxyalkacyclating materials consisting essentially of cellulose with alkoxyalkacidic anhydrides in presence of acylation catalysts.
8. Process for the manufacture of alkoxyalkacyl esters of cellulose, comprising alkoxyalkacylating materials consisting essentially of cellulose with alkoxyalkacidic anhydrides in presence of acylation catalysts and a liquid acylation medium.
9. Process for the manufacture of alkoxyacetyl esters of cellulose, comprising alkoxyacetylating materials consisting essentially of cellulose with alkoxyacetic anhydrides in presence of acylation catalysts.

10. Process for the manufacture of alkoxyacetyl esters of cellulose, comprising alkoxyacetylating materials consisting essentially of cellulose with alkoxyacetic anhydrides in presence of acylation catalysts and a liquid acylation medium.

11. Process for the manufacture of alkoxyacetyl esters of cellulose, comprising alkoxyacetylating materials consisting essentially of cellulose with alkoxyacetic anhydrides in presence of acylation catalysts and a liquid solvent for the cellulose derivative.

12. Process for the manufacture of alkoxyacetyl esters of cellulose, comprising alkoxyacetylating materials consisting essentially of cellulose with alkoxyacetic anhydrides in presence of acylation catalysts, a liquid non-solvent and a liquid solvent for the cellulose derivative.

13. In a process for acylating materials consisting essentially of cellulose, the step of pretreating the materials with alkoxyacetic acids.

14. Process for the manufacture of alkoxyacetyl derivatives of cellulose, comprising treating materials consisting essentially of cellulose with acids to render them reactive and then alkoxyalkacylating with alkoxyacetic anhydrides in presence of acylation catalysts.

15. Process for the manufacture of alkoxyacetyl derivatives of cellulose, comprising treating materials consisting essentially of cellulose with organic acids to render them reactive and then alkoxyalkacylating with alkoxyacetic anhydrides in present of acylation catalysts.

16. Process for the manufacture of cellulose methoxyacetates, comprising methoxyacetylating materials consisting essentially of cellulose with methoxyacetic anhydride in presence of acylation catalysts.

17. Process for the manufacture of cellulose methoxyacetates, comprising methoxyacetylating materials consisting essentially of cellulose with methoxyacetic anhydride in presence of acylation catalysts and a liquid acylation medium.

18. Process for the manufacture of cellulose methoxyacetates, comprising methoxyacetylating materials consisting essentially of cellulose with methoxyacetic anhydride in presence of acylation catalysts and a liquid solvent for the cellulose derivative.

19. Process for the manufacture of cellulose methoxyacetates, comprising methoxyacetylating materials consisting essentially of cellulose with methoxyacetic anhydride in presence of acylation catalysts, a liquid non-solvent and a liquid solvent for the cellulose derivative.

20. In a process for acylating materials consisting essentially of cellulose, the step of pretreating the materials with methoxyacetic acid.

21. Process for the manufacture of cellulose methoxyacetates, comprising treating materials, consisting essentially of cellulose with organic acids to render them more reactive and then methoxyacetylating with methoxyacetic anhydride in presence of acylation catalysts.

22. Process for the manufacture of cellulose methoxyacetates, comprising treating materials consisting essentially of cellulose with methoxyacetic acid to render them more reactive and then acylating with methoxyacetic anhydride in presence of acylation catalysts.

23. Process for the manufacture of secondary alkoxyalkacyl esters of cellulose, comprising alkoxyalkacylating materials consisting essentially of cellulose with alkoxyalkacidic anhydrides in the presence of acylation catalysts, and subjecting the resulting primary alkoxyalkacyl esters to processes which change their solubility characteristics.

24. Process for the manufacture of secondary alkoxyalkacyl esters of cellulose, comprising alkoxyalkacylating materials consisting essentially of cellulose with alkoxyalkacidic anhydrides in the presence of acylation catalysts, and subjecting the resulting alkoxyalkacyl esters to acidic substances so as to change their solubility characteristics.

25. Process for the manufacture of secondary alkoxyalkacyl esters of cellulose, comprising alkoxyalkacylating materials consisting essentially of cellulose with alkoxyalkacidic anhydrides in the presence of acylation catalysts, and subjecting the resulting alkoxyalkacyl esters to the action of substances having mineral acidity so as to change their solubility characteristics.

26. Process for the manufacture of secondary cellulose methoxy acetates, comprising methoxyacetylating materials consisting essentially of cellulose with methoxy acetic anhydride in the presence of acylation catalysts and subjecting the resulting primary cellulose methoxy acetates to processes which change their solubility characteristics.

27. Process for the manufacture of secondary cellulose ethoxy acetates, comprising ethoxyacetylating materials consisting essentially of cellulose with ethoxy acetic anhydride in the presence of acylation catalysts and subjecting the resulting primary cellulose ethoxy acetates to processes which change their solubility characteristics.

28. Secondary alkoxyalkacyl esters of cellulose.

29. Secondary cellulose methoxy acetates.

30. Secondary cellulose ethoxy acetates.

HENRY DREYFUS.